March 17, 1931. A. J. LEWIS 1,796,797
AUTOMATIC CHUCKING MACHINE
Filed Oct. 3, 1928 3 Sheets-Sheet 1

Inventor
Arthur J. Lewis
By Wooster & Davis
Attorneys

March 17, 1931.  A. J. LEWIS  1,796,797
AUTOMATIC CHUCKING MACHINE
Filed Oct. 3, 1928  3 Sheets-Sheet 3

Inventor
Arthur J. Lewis
By Wooster & Davis
Attorneys

Patented Mar. 17, 1931

1,796,797

UNITED STATES PATENT OFFICE

ARTHUR J. LEWIS, OF STRATFORD, CONNECTICUT, ASSIGNOR TO THE BAIRD MACHINE COMPANY, OF BRIDGEPORT, CONNECTICUT, A CORPORATION OF CONNECTICUT

AUTOMATIC CHUCKING MACHINE

Application filed October 3, 1928. Serial No. 310,156.

This invention relates to a chucking machine, particularly of the multiple spindle type in which a plurality of work spindles are carried in a rotatable turret which is indexed at the end of each work cycle bringing the work to the different stations, and has for an object to provide an improved and automatic means for opening the chuck at the loading station to facilitate the removal of the finished work and the insertion of the new work.

It is also an object of the invention to provide a safety device which will prevent indexing of the turret should the operator not have finished the operation of unloading and loading the chuck at the loading station.

It is another object of the invention to provide a device which will prevent indexing of the turret while the chuck at the loading station is open.

With the foregoing and other objects in view, the invention consists in certain novel features of construction, combinations and arrangements of devices as will be more fully described in connection with the accompanying drawings. In these drawings, Fig. 1 is a front side elevation of the machine with certain elements broken away to more clearly show the construction.

Fig. 5 is a detail of a portion of the safety device.

Figure 2:
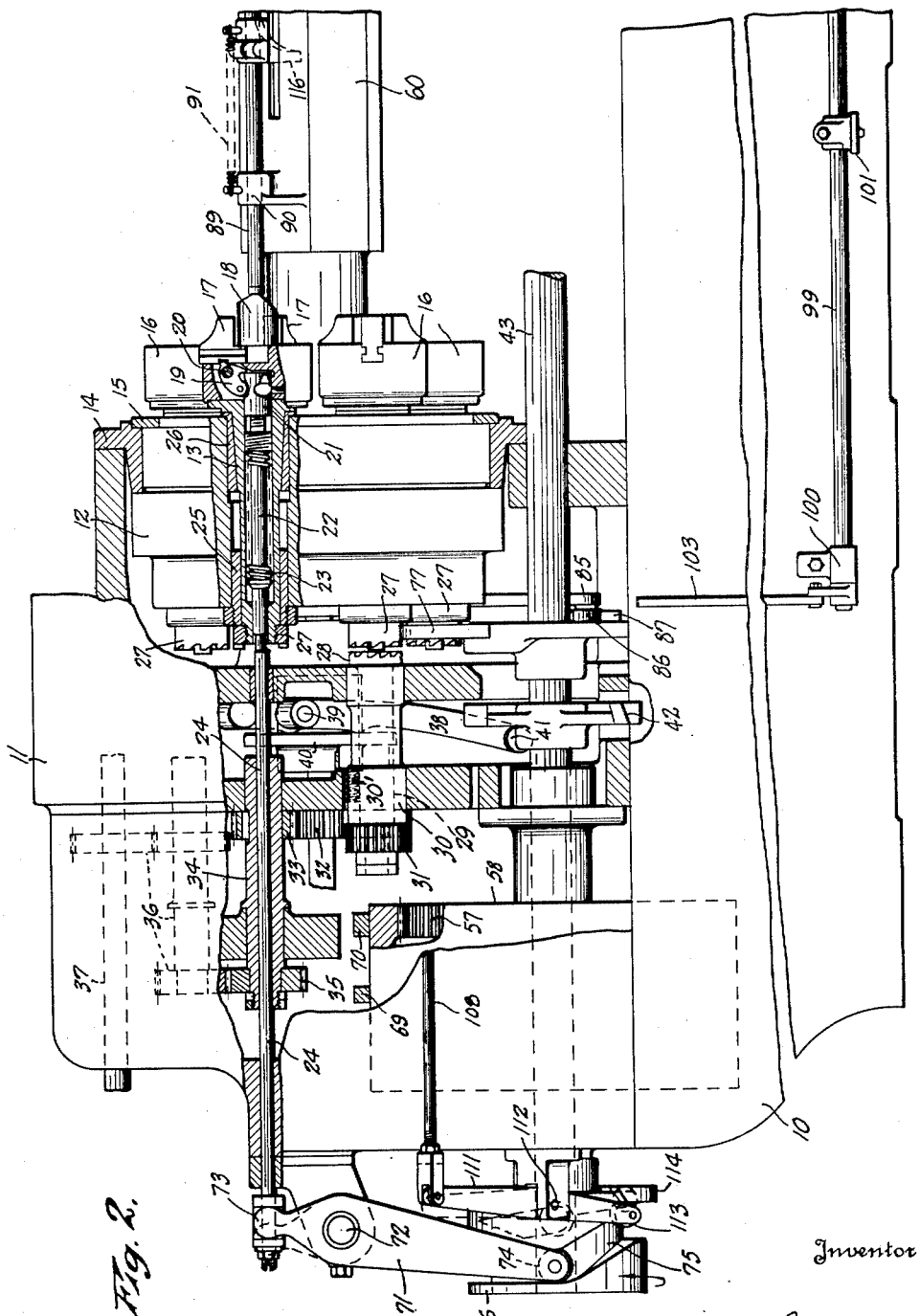
Fig. 2 is a similar view with other elements shown in section.

The machine illustrated comprises a bed 10 carrying an upright frame or housing 11 in which the rotatable turret 12 carrying the work spindles 13 is mounted. The turret is mounted to rotate in any suitable manner as in a bearing 14 mounted in the housing. It is held therein by a ring 15. The turret carries any suitable number of work spindles 13, there being six of these spindles shown in the drawing, and each spindle carries a chuck 16 which may be of the construction shown and described in my copending application Serial No. 291,867, filed July 11, 1928. This chuck as described in said application comprises two or more jaws 17 which are mounted to slide toward and from the work, indicated at 18, to grip the same and hold it in the chuck. Each jaw is connected to a bell crank lever 19 pivoted in the head at 20 and cooperating with a longitudinally slidable cam 21, which by longitudinal sliding movement in the hollow spindle 13 operates the levers 19 and shifts the jaws 17 toward and from the work. The cam block 21 is connected to a bar 22 which is also shiftable longitudinally in the spindle and may be shifted to the left as viewed in Fig. 2, which movement will clamp the jaws 17 onto the work, by means of a spring 23 or other suitable means, and it is automatically shifted in the opposite direction by a rod 24 which may engage the end of the bar 22 and is operated by means presently to be described. The spindles 13 are mounted in suitable bearings 25 and 26 in the turret and are operated by means of a clutch block 27 on each spindle having teeth to engage with a corresponding clutch block 28 on driving spindles 29, there being one of these driving spindles at each of the work stations, but none at the loading station which is the station at which the spindle shown in section in Fig. 2 is located. Each driving spindle 29 is mounted in a slidable sleeve 30 mounted to slide in the housing or frame 11 longitudinally of the axes of the work spindles to thus disengage and engage the clutch blocks 27 and 28 for driving the work spindles at the respective stations. Each spindle 29 is driven by a gear 31 which may mesh with other gears 32 driven from gear 33 on the main driving shaft 34. This shaft is driven by a gear 35 which is driven through suitable reducing drive mechanism indicated in dotted lines at 36 from a power shaft 37 which is driven from any suitable source of power.

It is, of course, understood that before an indexing operation of the turret the driving connection between the spindles 29 and the work spindles 13 must be disconnected. This is accomplished by sliding the sleeves 30 carrying the spindles 29 away from the work spindles 13, as indicated in Fig. 2. All the five spindles 29 are shifted simultaneously and automatically by a lever 38 pivoted in the frame at 39 and engaging a member 40 which is connected to each of the sleeves 30, there being a spring for each sleeve tending to shift it to the right to cause the clutch block 28 to engage the aligned clutch block 27 of a work spindle. This shifting mechanism is illustrated and described in detail in my copending application Serial No. 291,867 filed July 11, 1928. The lever 38 has a roller or block 41 cooperating with a cam 42 on a cam shaft 43 which is driven from the main drive 37 through an upright feed drive indicated diagrammatically at 44. This drive includes a clutch 45 which may be shifted to and from driving position by a slidable collar 46 through a bell crank 47 pivoted at 48 and connected by a link 49 with an arm 50 on a shaft 51 on which is secured a hand lever 52. A worm and gear drive 53 connects the shaft 54 on which the sleeve 46 is splined with a short shaft 55, and this shaft through a pinion 56 meshing with a gear 57 on the interior of the cam drum 58 operates the cam and feed shaft 43.

Extending forwardly from the turret is a tool support 59 carrying a guide head 60 for tool carriers, not shown, but which are connected to operating member 61 slidable in the suitable guides in the head 60 and connected at their opposite ends, as indicated at 62, to flanged blocks or rings 63 within the head 60 and mounted on slidable shafts 64 and 65. There may be one of these tool operating elements 61 at each working station, and the operating shafts 64 and 65 therefor are shifted longitudinally to move the tools toward and from the work by means of blocks 66 and 67 connected to these shafts and having rollers 68 cooperating with cams 69 and 70 on the cam drum 58. This feed mechanism is described more fully and claimed in my copending application Serial No. 636,856, filed May 5, 1923, which has become Patent No. 1,689,440, Oct. 30, 1928.

The rod 24 for automatically releasing the clutch at the loading station is shifted by means of a lever 71 pivoted to the frame at 72 and connected to the rod 24, as indicated at 73. At its opposite end this lever carries a roller 74 running in a cam groove 75 in a cam block 76 on the shaft 43 so that the rod 24 is shifted in certain timed relation with the indexing mechanism to open the clutch jaws and release the work only at a given time. It also operates the rod 24 to release the bar 22 and permit the clutch jaws to be closed and clamped onto the work by means of the spring 23 or other operating means.

Figure 3:
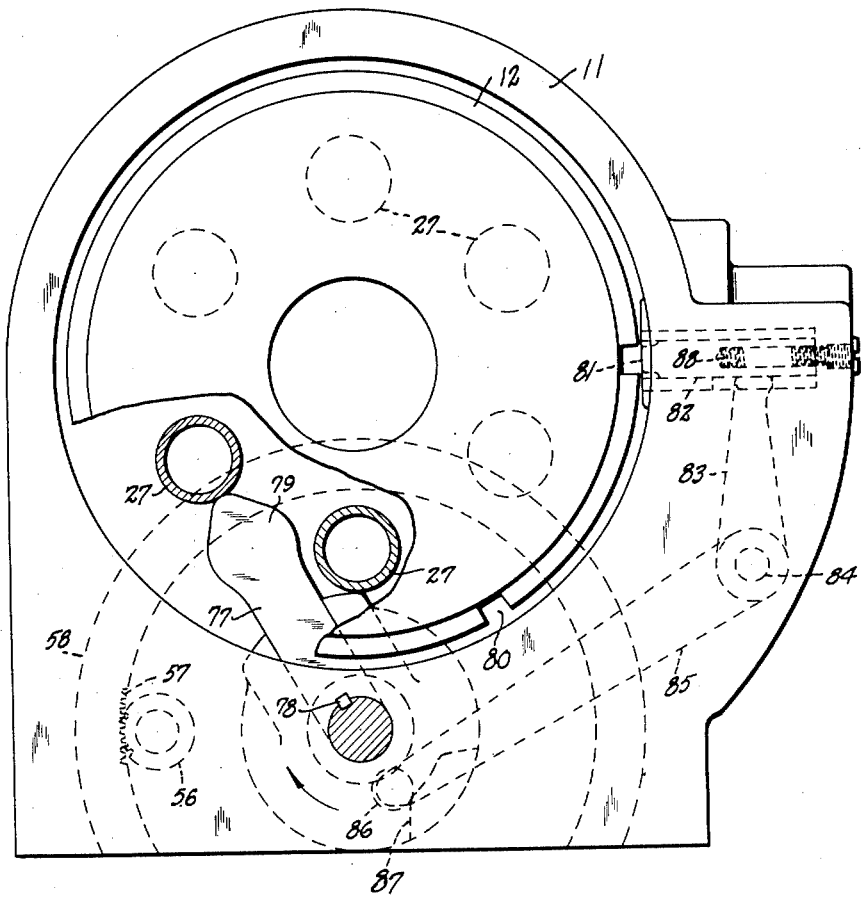
Fig. 3 is a detail of the indexing mechanism.

As the finished work is ordinarily removed from the chuck and new work is inserted at the loading station, this unloading and loading operation is performed while the work is being done on the other five spindles, and as the indexing of the turret is automatic at the end of a work cycle unless otherwise interfered with, means is provided for automatically preventing indexing of the turret if for any reason the loading operation has not been completed at the end of a work cycle or at the time when the next indexing operation is due. The indexing mechanism is shown more clearly in Figs. 2 and 3. Mounted on the shaft 43 is an arm 77 which is keyed to the shaft, as indicated at 78, to rotate with it, and this arm has a head 79 adapted to engage the outer surfaces of the clutch blocks 27 to rotate the turret 12 one step on each complete revolution of the shaft 43. There is means associated with this mechanism for locking the turret in proper position between indexing operations and to automatically unlock it before the indexing operation and to lock it after the indexing operation is completed. For this purpose the turret is provided with suitably spaced recesses 80 adapted to receive the end 81 of a slidable locking pin 82 which is connected to an arm 83 pivoted at 84 and connected to another arm 85 having a roller 86 cooperating with a cam block 87 on the shaft 43. This cam block 87 is so located and shaped as to lift the arm 85 and retract the pin 82 to unlock the turret just prior to the time the arm 77 engages one of the clutch blocks 27 to turn the turret to shift the respective work spindles 13 from one station to the next station. As soon as this shifting of the turret is completed the cam 87 permits the spring 88 to shift the pin 82 into the next recess 80 in the turret and lock it in this position until the next indexing operation.

Figure 1:
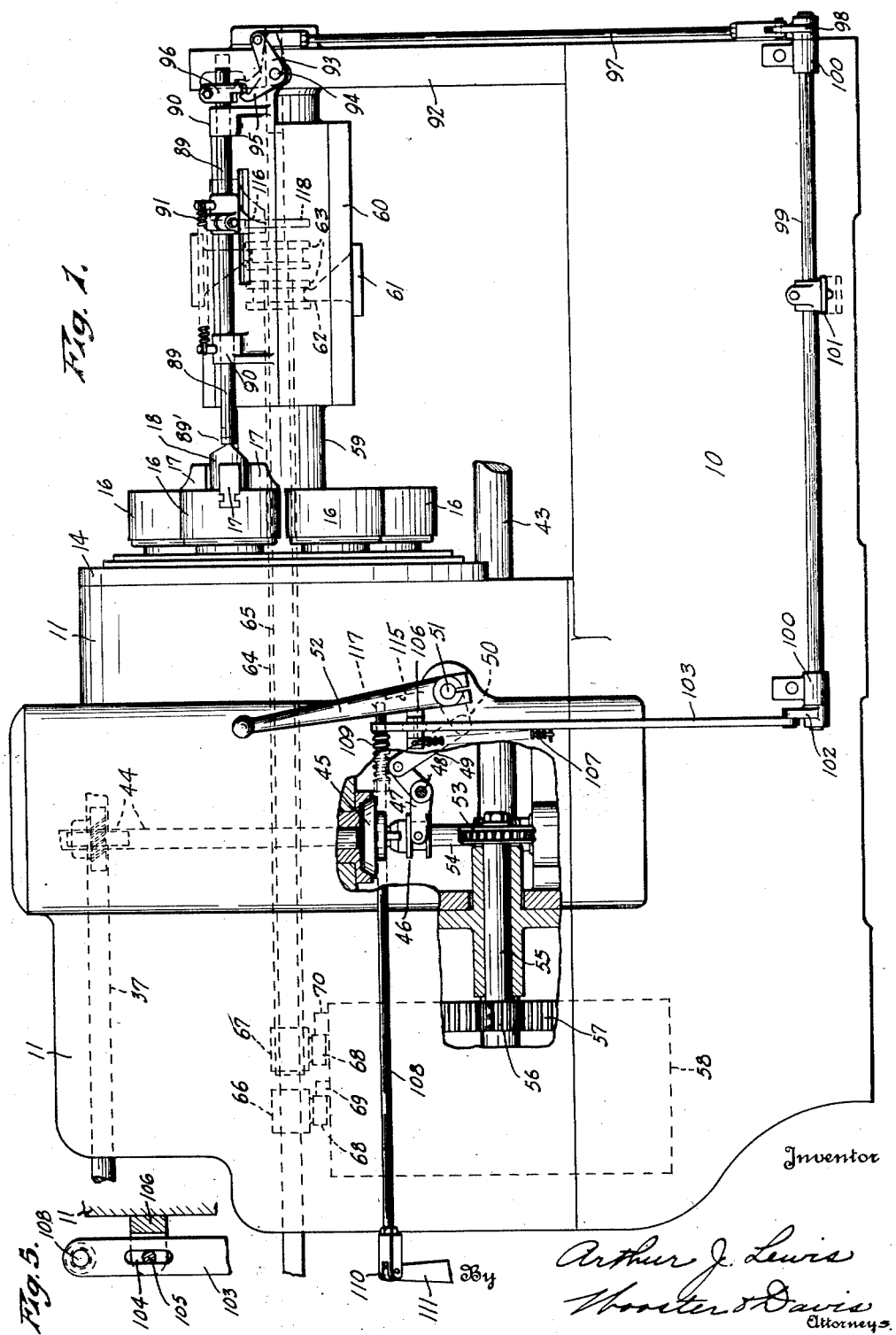
Figure 4:
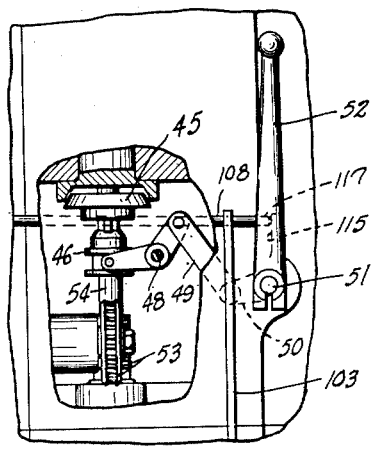
Fig. 4 is a detail of the drive for the indexing mechanism showing its relation to the safety device.

My improved safety device for preventing indexing of the turret should the operator not have completed the loading operation at the end of the work cycle is shown in Figs. 1, 2 and 4. It includes a plunger 89 mounted to slide longitudinally in suitable bearings 90 on the tool support and guide 60, and a spring 91 tends to shift this plunger toward the work spindles and hold its inner end 89' in engagement with the work 18 in the chuck at the loading station. Pivoted on the support 92 for the tool support 60 is a bell crank lever 93, this pivot being shown at 94. This lever has an arm 95 engaging a block 96 adjustably mounted on the plunger 89. The other arm of this lever is connected by a link bar 97 with an arm 98 on a shaft 99 mounted in suitable bearings 100 on the bed 10 and which shaft carries a treadle lever 101. This shaft 99 also carries a lever 102 connected to an upright bar 103 which has an elongated slot 104 (Fig. 5) to receive a pin 105 carried in a bracket 106 mounted on the side of the housing. This pin and slot guides the bar 103 for vertical movement. A spring 107 connected to the bracket 106 and the bar 103 tends to lift this bar and the treadle lever 101 to their raised position.

At its upper end the bar 103 has a transverse opening for a rod 108 which rod is slidable longitudinally in this opening, and a spring 109 embracing the rod 108 is secured to it at one end and engages the bar 103 at its opposite end and tends to shift the rod 108 to the left, as viewed in Fig. 1. This rod is connected at 110 to a lever 111 pivoted to the housing at 112 carrying a roller 113 co-operating with a cam 114 on the shaft 43. The hand lever 52 is provided with an ear 115 which under certain conditions is in alignment with the end of the rod 108 for a purpose which will presently be described.

Operation: As indicated above the cam and feed shaft 43 is driven from the main power drive in such a manner that it makes one complete revolution during each work cycle, and the movement of the indexing arm 77 secured on this shaft 43 is so timed as to index the turret one step between two successive work cycles. At the end of the work cycle or when it is time for the indexing operation the cam 42 operating through the lever 38 shifts the drive spindles 29 to the left to disconnect the clutch drives 28—27 to the work spindles, as indicated in Fig. 2. Then the cam 87 (Fig. 3) disconnects the locking pin 82 releasing the turret so that it may be turned by the arm 77. At the end of the indexing operation the cam 87 releases the locking pin 82 permitting it to lock the turret in its new position, and then the cam 42 permits the shifting of the driving spindles 29 toward the work spindles to cause the clutches 28—27 to engage for rotating the work spindles 13 in the five work stations. The feed cams 69 and 70 are so arranged as to withdraw the tools from the work by shifting them to the right away from the work at the end of a work cycle and prior to the indexing operation. At the end of a working operation or cycle the plunger 89 is drawn back with the tools through the connection 116 engaging the outer side of a member 118 on one of the shafts 64 or 65 and all the chucks remain closed during the indexing operation. After the indexing operation has been completed the tools move forwardly to start the next working cycle and at the same time permit the plunger 89 to advance into engagement with the finished work, indicated at 18, in the chuck at the loading station. This chuck is then opened by the rod 24 through the action of the cam 75, the work 18 being retained in the chuck and prevented from dropping therefrom by the plunger 89. If the operator wishes to take this finished piece out of the chuck he retracts the plunger 89, that is, shifts it to the right by pressing on the foot treadle 101, the plunger being retracted by the action of the connecting rod 97 and the bell crank lever 93. He can then take out the finished piece and put a new piece in the chuck, the chuck being held open by the cam 75. The depression of the foot treadle 101 also shifts the bar 103 downwardly carrying with it the free end of the rod 108 so that this free end, indicated at 117, lies behind the ear 115 on the hand lever 52. The cam 114 is arranged to shift the rod 108 to the right before the next indexing operation, and if the indexing and feed mechanism should come to the point for the next indexing operation before the foot treadle is released the shifting of this rod 108 will cause the end 117 to push on the ear 115 and throw the lever 52 over so as to disconnect the clutch 45 in the drive for the feed and indexing mechanisms, as indicated in Fig. 4. This will, therefore, stop the feed and indexing mechanism so that there can be no indexing of the turret so long as the treadle 101 is depressed. The operator should hold this treadle depressed until the work is properly positioned in the chuck at the loading station, and if the work is not in place in time for the next indexing operation in the normal operation of the machine the feed and indexing mechanism is automatically stopped. There is, therefore, no danger of the machine indexing the turret before the loading operation is completed. After the work is properly placed in the chuck the operator may release the foot treadle 101 which will permit spring 91 to advance the plunger 89 to engagement with the work which has just been placed in the chuck and will force it against the bottom of the chuck and hold it in proper position until the chuck closes. Release of the treadle will also permit spring 107 to raise the bar 103 and carry the free end 117 of the rod 108 above the ear 115. The operator may now shift the lever 52 to the left to engage the clutch 45 and permit the feeding and indexing mechanism to again function. The rod 108 is shifted to the right by cam 114 just before the clutch at the loading station starts to close and is held in this position until the chuck is completely closed. Therefore, if the treadle 101 is depressed when rod 108 is shifted the feeding and indexing mechanism is stopped before the chuck closes, and after the lever 52 is shifted to the left by the operator to again start the feeding and indexing mechanism the chuck at the loading station immediately starts to close. However, as the rod 108 lies over the top of ear 115 while the chuck is closing it will be impossible for the operator to start the feed and indexing mechanism and then depress the treadle 101 and withdraw the plunger 89 before the chuck completely closes. The plunger 89, therefore, holds the work in the proper position until the chuck is completely closed on the work.

It will be apparent from the foregoing description that the machine will operate automatically to index the turret between the successive working cycles to shift the work to the successive stations for the various operations to be performed, and that the clutch at the loading station is automatically opened to permit the operator to remove the finished work and insert a new piece to be worked upon, but that should the operator fail to complete the loading operation before the time for the next indexing operation the feed and indexing mechanism is automatically stopped until the work is properly placed in the chuck, after which the machine may then be started by the operator to permit the chuck at the loading station to close and permit the machine to then index for the next work cycle. It will, of course, be understood that if the operator should finish the loading operation and remove his foot from the treadle 101 before the work cycle is completed the plunger 89 will move into engagement with the work in the chuck at the loading station and will hold it in position to be gripped by the jaws of the chuck when the rod 24 is shifted to the left just prior to the next indexing operation. The release of the treadle 101 also permits the bar 103 to raise the end 117 of the rod 108 above the ear 115 on the lever 52, and therefore, when this bar 108 is shifted to the right by the cam 114 just prior to the next indexing operation the end 117 will merely pass over the top of the ear 115, and therefore, will have no effect on the arm 52 and will not disconnect the clutch 45, so that the indexing operation will continue in the usual manner.

The plunger 89 also insures uniform and proper placing of the work in the chuck. In properly positioning the work in the chuck it should be pressed against the wall at the back of the chuck which limits its movement into the chuck. If the operator becomes careless so as not to properly place the work in the chuck this is automatically done by the plunger and then the plunger holds the work in this position until the jaws of the clutch close. The liability of the work being improperly placed in the chuck is thus reduced to a minimum. It will be clear from the operations described that this safety device effectively prevents improper operation of the machine by a careless operator.

Having thus set forth the nature of my invention, what I claim is:

1. In a machine of the character described, a rotatable turret, a plurality of work spindles carried by said turret providing a loading station and one or more work stations, work holding devices carried by said spindles, means for driving the spindles, tools for the working stations, means for advancing and retracting the tools, means for indexing the turret to bring the spindles to the respective stations, work retaining means movable with the tools adapted to engage the work at the loading station and retain it in the work holding device, and means for operating the work holding device at the loading station to hold and release the work in certain timed relation with the indexing operation.

2. In a machine of the character described, a rotatable turret, a plurality of work spindles carried by said turret providing a loading station and one or more work stations, work holding chucks carried by said spindles, means for driving the spindles, means for indexing the turret to move the spindles to the respective stations, means for advancing and retracting the tools in certain timed relation with the indexing operation, a plunger movable with the tools adapted to engage the work at the loading station, personally operated means for retracting said plunger, automatic means for opening and closing the chuck at the loading station in certain timed relation with said indexing operation, and means controlled by said personally operated means for preventing functioning of the indexing means when the plunger is retracted by the personally operated means.

3. In a machine of the character described, a rotatable turret, a plurality of work spindles carried by said turret providing a loading station and one or more work stations, work holding chucks carried by the spindles, means for indexing the turret to move the spindles to the various stations, a plunger movable to engagement with the work at the loading station and adapted to position and retain the work in the chuck at this station when the chuck is open, personally operable means for retracting the plunger, means for operating the plunger in certain timed relation with the indexing means and means connected with the chuck operating means to prevent retraction of the plunger while the chuck is closing.

4. In a machine of the character described, a plurality of work holding chucks providing a loading station and one or more work stations, means for indexing the chucks to move them to the respective stations, a work retaining means movable to engagement with the work in the chuck at the loading station, personally operated means to retract said retaining means from the work, and means controlled by said personally operated means to prevent functioning of the indexing means when the retaining means is retracted by the personally operated means.

5. In a machine of the character described, a rotatable turret, a plurality of work spindles carried by said turret providing a loading station and one or more work stations, driving means for the spindles, work holding chucks carried by the respective spindles, automatic means for indexing the turret, a driving connection from said driving means to the indexing means including a clutch, tools movable toward and from the work at the working station or stations, means operated by said clutch for shifting the tools, a plunger movable with the tools and adapted to engage the work in the chuck at the loading station, a personally operated means for retracting the plunger, automatic means operated in certain timed relation with the indexing means to open the chuck at the loading station, and means connected with the indexing means and controlled by the personally operated means to release said clutch if the plunger is retracted by the personal means at the time for an indexing operation.

6. In a machine of the character described, a rotatable turret, a plurality of work spindles carried by said turret providing a loading station and one or more work stations, work holding chucks carried by said spindles, means for driving the spindles, means for indexing the turret to move the spindles to the respective stations, a plunger movable longitudinally of the axis of the spindle toward and from the work at the loading station, a personally operated means for retracting said plunger including a shiftable bar, a driving connection to the indexing means including a clutch, a shiftable rod connected with the indexing means, means for operating the clutch, and a connection from said bar to the rod to shift the rod to and from operative relation with the clutch operating means.

7. In a machine of the character described, a rotatable turret, a plurality of work spindles carried by said turret providing a loading station and one or more work stations, a cam shaft, a drive for the spindles, a drive for the cam shaft including a clutch, work holding chucks carried by the spindles, tool carriers forwardly of the turret, means operated by the cam shaft for shifting said tool carriers toward and from the chucks, means operated by the cam shaft for indexing the turret, a plunger movable with the tool carriers toward and from the work at the loading station and movable away from the work independently of the carriers, means operated by the cam shaft for opening and closing the chuck at the loading station, personally operated means for retracting the plunger, means operated by the cam shaft capable of releasing said clutch, and means operated by the personally operated means for controlling the operation of the clutch releasing means.

8. In a machine of the character described, a rotatable turret, a plurality of work spindles carried by said turret providing a loading station and one or more work stations, work holding chucks carried by the spindles, automatic means for indexing the turret, a plunger capable of retaining the work in the chuck at the loading station, automatic means for shifting said plunger in timed relation with the indexing operation, automatic means for opening and closing the chuck at the loading station in timed relation with the indexing operation, personally operable means for retracting the plunger, and means controlled by said latter means for stopping the indexing means when the plunger is so retracted.

9. In a machine of the character described, a rotatable turret, a plurality of work spindles carried by said turret providing a loading station and one or more work stations, work holding chucks carried by the spindles, means for indexing the turret to move the spindles to the various stations, automatic means operated in certain timed relation with the indexing operation to open and close the chuck at the loading station, a plunger movable to engagement with the work at the loading station to position and retain the work in the chuck at this station, and means for operating the plunger in certain timed relation with the opening and closing of the chuck.

10. In a machine of the character described, a rotatable turret, a plurality of work spindles carried by said turret providing a loading station and one or more work stations, a cam shaft, a drive for the spindles, a drive for the cam shaft including a clutch, work holding chucks carried by the spindles, means operated by the cam shaft for indexing the turret, a work retaining means movable to and from engagement with the work at the loading station, means operated by the cam shaft for opening and closing the chuck at the loading station, personally operated means for retracting the work retaining means, means operated by the cam shaft capable of releasing said clutch, and means operated by the personally operated means for controlling the operation of the clutch releasing means.

11. In a machine of the character described, a rotatable turret, a plurality of work spindles carried by said turret providing a loading station and one or more work stations, driving means for the spindles, means for automatically indexing the turret, work holding chucks carried by the spindles, means for automatically opening and closing the chuck at the loading station in certain timed relation with the indexing operation, a work retaining means movable to and from engagement with the work at the loading station, personally operated means for retracting the work retaining means, and means operated by the personally operated means for controlling the indexing means.

12. In a machine of the character described, a rotatable turret, a plurality of work spindles carried by said turret providing a loading station and one or more work stations, driving means for the spindles, means for automatically indexing the turret, work holding chucks carried by the spindles, means for automatically opening and closing the chuck at the loading station in certain timed relation with the indexing operation, a work retaining means movable to and from engagement with the work at the loading station, means for operating the work retaining means in certain timed relation with the opening and closing of the chuck, personally operated means for retracting the work retaining means, and means operated by the personally operated means for controlling the indexing means.

13. In a machine of the character described, a rotatable turret, a plurality of work spindles carried by said turret providing a loading station and one or more work stations, work holding chucks carried by the spindles, means for indexing the turret to move the spindles to the various stations, automatic means operated in certain timed relation with the indexing operation to open and close the chuck at the loading station, a work retaining means movable to and from the work at the loading station, means for automatically shifting the work retaining means in certain timed relation with the opening and closing of the chuck, personally operated means for retracting the work retaining means, and means operated by the personally operated means for controlling the indexing means.

14. In a machine of the character described, a rotatable turret, a plurality of work spindles carried by said turret providing a loading station and one or more work stations, driving means for the spindles, means for automatically indexing the turret including a clutch, a hand operated lever for controlling said clutch, work holding chucks carried by said spindles, a work retaining means movable to and from engagement with the work at the loading station, personally operated means for retracting the work retaining means, means operated in certain timed relation with the indexing means capable of shifting the hand lever to release the clutch, and means operated by the personally operated means for controlling the effect of said lever shifting means.

15. In a machine of the character described, a rotatable turret, a plurality of work spindles carried by said turret providing a loading station and one or more work stations, work holding chucks carried by said spindles, means for automatically indexing the turret, automatic means for opening and closing the chuck at the loading station in certain timed relation with the indexing operation, a work retaining means movable to and from engagement with the work at the loading station, automatic means for opening and closing the chuck at the loading station in certain timed relation with the indexing operation, personally operated means for retracting the work retaining means, and means operated in timed relation with the chuck operating means to prevent retraction of the work retaining means while the chuck is closing.

In testimony whereof I affix my signature.
ARTHUR J. LEWIS.